United States Patent
Pate

(10) Patent No.: US 11,801,447 B1
(45) Date of Patent: Oct. 31, 2023

(54) CROSS-ERA SPORTS GAME SYSTEM AND PROCESSES

(71) Applicant: Aaron Michael Pate, Kingwood, TX (US)

(72) Inventor: Aaron Michael Pate, Kingwood, TX (US)

(73) Assignee: Aaron Pate, Houston, TX (US)

(*) Notice: Subject to any disclaimer, the term of this patent is extended or adjusted under 35 U.S.C. 154(b) by 0 days.

(21) Appl. No.: 18/094,326

(22) Filed: Jan. 6, 2023

Related U.S. Application Data

(60) Provisional application No. 63/297,142, filed on Jan. 6, 2022.

(51) Int. Cl.
*A63F 13/828* (2014.01)
*A63F 13/71* (2014.01)

(52) U.S. Cl.
CPC ............ *A63F 13/828* (2014.09); *A63F 13/71* (2014.09)

(58) Field of Classification Search
CPC .... A63F 13/828; A63F 13/71; A63F 2300/69; A63F 13/65; G06F 16/2379
See application file for complete search history.

(56) References Cited

U.S. PATENT DOCUMENTS

| | | | |
|---|---|---|---|
| 2016/0171580 A1* | 6/2016 | Waters | H04L 9/3231 705/26.5 |
| 2020/0155944 A1* | 5/2020 | Witchey | H04L 9/3297 |
| 2020/0250176 A1* | 8/2020 | Padmanabhan | G06F 16/27 |
| 2020/0312089 A1* | 10/2020 | Joao | H04L 67/52 |
| 2020/0353367 A1* | 11/2020 | Palmer | A63F 13/65 |
| 2020/0372763 A1* | 11/2020 | Greiner, Jr. | G07F 17/3288 |
| 2022/0096941 A1* | 3/2022 | Toombs | A63F 13/828 |

* cited by examiner

*Primary Examiner* — William H McCulloch, Jr.
*Assistant Examiner* — Ankit B Doshi
(74) *Attorney, Agent, or Firm* — Plager Schack LLP; Mark H. Plager; Stephen Hallberg

(57) ABSTRACT

A cross-era sports game system that involves current and historical players, trading cards, stats, and fantasy sports, and is configured to tie fantasy play to physical trading card or token player assets through substitutions or live game play is disclosed. The cross-era sports game system provides a manual or digital sports game everyone can play using historical players, trading cards, stats and fantasy sports.

13 Claims, 8 Drawing Sheets

CROSS-ERA SPORTS GAME SYSTEM AND PROCESSES

CLAIM OF BENEFIT TO PRIOR APPLICATION

This application claims benefit to U.S. Provisional Patent Application 63/297,142, entitled "CROSS-ERA SPORTS GAME SYSTEM THAT INVOLVES CURRENT AND HISTORICAL PLAYERS, TRADING CARDS, STATS, AND FANTASY SPORTS, AND IS CONFIGURED TO TIE FANTASY PLAY TO PHYSICAL TRADING CARD OR TOKEN PLAYER ASSETS," filed Jan. 6, 2022. The U.S. Provisional Patent Application 63/297,142 is incorporated herein by reference.

BACKGROUND

Embodiments of the invention described in this specification relate generally to fantasy sports games, and more particularly, to a cross-era sports game system that involves current and historical players, trading cards, stats, and fantasy sports, and is configured to tie fantasy play to physical trading card or token player assets.

Many problems in the existing world of fantasy sports games have never been addressed or solved. First, all fantasy managers today have a problem when their current roster of players incur injuries, do not play due to bye weeks, or play poorly and make their team lose a fantasy match-up. Each fantasy manager tries to solve the issue by using the free agency pickup pool. However, the players typically are not as good here and luck plays a role.

Second, current fantasy sports games fail to indulge in the age-old debate about who the best players of all time are. The problem is that sports people do not really talk about historical players and their greatness at a game-by-game level. They talk about career numbers most of the time, leaving in the wake the day-to-day grind and brilliance that so many Hall of Famers have. Instead, fantasy sports games today are only focused on current players, which represent only a small portion of the sports world when viewed in the context of historical all-time players. Specifically, there is no game today that uses the actual historical statistics in live and present day formats, pitting together any variety of historical players and current players in any sport.

Furthermore, none of the existing fantasy sports games involve scoring with actual statistics from the past that the players of past eras earned. Some systems use made-up or game cards specific to their games, including using dice or card dealing rules like a game of battle. However, none of the existing fantasy sports game systems do anything in the way of solving the problem of poor quality free agent players. Instead, users end up having to make an arbitrary and unsatisfying pickup in the free agent pool when they lose a player on their current roster to injury, etc., and hope for the best on game day when they play.

Another existing problem for sports trading cards altogether is that there is no way to use the cards in a game or competition. Sports trading cards are only used as collector's items and investment pieces. Their worth now is completely based on card rarity, condition, the player's name, and any special features or designs a card manufacturer creates. Today, card collectors buy, sell, and trade based off of this current system. No game has currently unlocked the opportunity to score over a billion average trading cards from the last hundred+ years in a game by using the stats on the card, the historical stats by the player in the year of the card, the current price of the card, or the grading rating as a scoring factor in a live game.

Therefore, what is needed is a way to add players from across all eras in fantasy sports game play against current players and players of other eras and a way to join the fantasy sports and card collecting audiences together to benefit from the common and overlapping interests and personalities of those members.

BRIEF DESCRIPTION

A novel cross-era sports game system and processes are disclosed which involve current and historical players, trading cards or digital player cards, stats, and fantasy sports in a way that ties fantasy play to physical trading card(s) or token player assets and employs blockchain technology to provide an immutable record of fantasy sports game play. In some embodiments, the cross-era sports game system comprises a cross-era sports game system server that hosts a fantasy sports cloud application platform service for users to connect and engage in fantasy sports leagues that allow for a variety of fantasy sports configurations such as, without limitation, cross-era fantasy sports, cross-border fantasy sports, historical greats versus current players, historical greats versus other historical greats, mixed historical and current players versus other mixed historical and current players, etc.

BRIEF DESCRIPTION OF THE DRAWINGS

Having described the invention in general terms, reference is now made to the accompanying drawings, which are not necessarily drawn to scale, and wherein.

DETAILED DESCRIPTION

Figure 1:
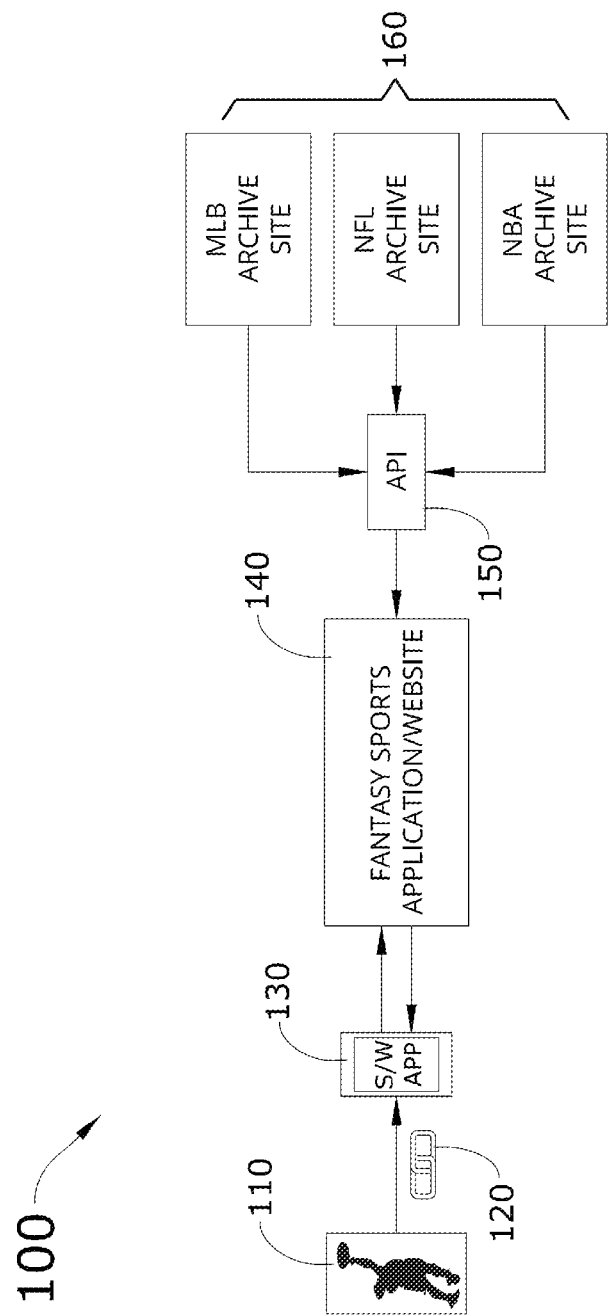
FIG. 1 conceptually illustrates a high-level schematic of a cross-era sports game system in some embodiments.

In the following detailed description of the invention, numerous details, examples, and embodiments of a cross-era sports game system are described. However, it will be clear and apparent to one skilled in the art that the invention is not limited to the embodiments set forth and that the invention can be adapted for any of several applications, not exclusively used in connection with cross-era sports games, but applicable to other sports games in which physical and/or digital player cards exist (or may be created). For instance, the methods and applications used in connection with the cross-era sports game system may apply easily to other sports games including, without limitation (i) cross-league sports games in which players in different leagues (possibly in the same country) of a same or similar sport are a focus of the sports game and (ii) cross-border sports games in which players in different countries or nations (and likely in different leagues) of a same or similar sport are a focus of the sports game, etc. Also, all communications, data storage, and blockchain standards specified in this disclosure sometimes described by references to individual users writing blockchain transactions to the blockchain. However, when described in that way, the understood action is actually of a computing device 'node' (which typically is the computing device operated by the user) writing the transaction block to the blockchain. Such exemplary descriptions are therefore not intended to be limiting, per se, but to conceptually demonstrate the pertinent actions at any given step.

Also, it is noted that the embodiments may be described in terms of technical processes for writing transactions to the blockchain in connection with cross-era fantasy sports league play. The technical processes described may include several operations such as those well know in the art (e.g., data encryption operations) and specific operations for writing to a block of an immutable ledger, etc., in different ways that align with particular implementations of blockchain. Furthermore, steps of these technical process may be preceding by several other operations (whether stated or not) including, for example, requesting data to be written to a block of the blockchain, validating nodes performing work in a proof of work (PoW) blockchain implementation, or nodes posted a stake of value to write the data as a transaction on the block in a proof of stake (PoS) blockchain implementation, or nodes offering authority credentials in a proof of authority (PoA) blockchain implementation, and another operation to determine which node will be the node to write the data transaction on the block as requested. Such steps (or similar steps for other operational code snippets or processing blocks) may therefore be shown collectively in a single block or individually across several blocks of the associated flowchart. Additionally, each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Some embodiments provide a novel cross-era sports game system and processes that involve current and historical players, trading cards, stats, and fantasy sports, and is configured to tie fantasy play to physical trading card(s) or token player assets. In some embodiments, the cross-era sports game system comprises a cross-era sports game system server that hosts a cloud application service for users to connect and engage in fantasy sports leagues that allow for a variety of fantasy sports configurations such as, without limitation, cross-era fantasy sports, cross-border fantasy sports, historical greats versus current players, historical greats versus other historical greats, mixed historical and current players versus other mixed historical and current players, etc.

In some embodiments, the cross-era sports game system comprises blockchain technology that is configured to immutably record all transactions for fantasy sports play. In some embodiments, the blockchain technology is utilized to deploy a blockchain implementation for each cross-era fantasy sports league that is created and engaged with by participating manager users. In some embodiments, the blockchain implementation comprises an architecture that is configured to operate as a proof-of-stake (PoS) blockchain in which individual users demonstrates a proof of stake by selection of a valuable card that can be lost to a winner of the fantasy sports league's season or during fantasy sports competitions, such as various head-to-head competitions, etc.

In some embodiments, the proof-of-stake blockchain architecture works by a stake validation process in which all users in a particular cross-era fantasy league need to accept a user's selection of a 'stake' card in order to self-write transaction blocks in the blockchain for the user's roster and league play transactions. In some embodiments, the stake card requires validating and acceptance from all other users as a sufficient proof of stake for the user to offer. For instance, if five out of six managers in a cross-era sports fantasy league offer rare and valuable baseball cards (e.g., rookie cards of historically great MLB players) as their stake cards, but the sixth manager offers a common card of an average player as their stake card, it is unlikely (but not impossible) that all of the other managers will accept the stake card since their stake offerings are relatively more significant and valuable. This allows for leagues to form where the stakes are much more in line across all managers/users.

When the stake cards are validated as sufficient—that is, when all other users accept the user's selected card as being sufficient—then the blockchain permits the user to self-write the blockchain transaction block(s) for declaring ownership of the cards selected for the user's roster. Furthermore, when the blockchain is implemented as a proof-of-stake blockchain, each user in any given fantasy league must provide a sufficient proof of stake card that is accepted by all other users and, upon acceptance by the other users, the computing device operated by the user acts as a self-validating node to write the blockchain transaction block(s) that declare ownership of the user's roster cards. In some embodiments, a formal appraisal and certification of authenticity is required by game rules agreed upon by the users in a fantasy league. When formal appraisal and certification of authenticity is required, each user who uploads digital images of the physical cards for their fantasy team roster also uploads a certificate of authenticity and appraisal from an agreed appraisal and certification service.

In some embodiments, the blockchain implementation comprises an architecture that is configured to operate as a token-based, proof-of-work (PoW) blockchain in which manager users participating in a cross-era fantasy sports league deposit tokens to play in the fantasy league. The computing device 'nodes' operated by the users who successfully provide proof of work to write blocks to the blockchain are awarded tokens that can be used to play in the league or other token-based actions in the fantasy league game play such as, without limitation, tokens required to make trades, tokens required to add new players to a roster, etc.

In some embodiments, the blockchain implementation comprises an architecture that is configured to operate as a proof-of-authority (PoA) blockchain in which nodes offering authority credentials to write transaction blocks in the blockchain are compared to determine which node will be the node to write the data transaction on the block as requested.

In some embodiments, the cross-era sports game system enables manager users to play the historical players alongside current players or alongside other historical players. In some embodiments, the cross-era sports game system is configured to operate as a trading cards system in which manager users can fill their roster with players from physical trading cards that are scanned, uploaded for game play, and stored in the blockchain. In some embodiments, the physical trading cards used by the manager users are appraised and certified as authentic before the scanned images of the trading cards are permitted to be used for game play. In some embodiments, the appraisal and certification of authenticity of each physical trading card is stored in the blockchain with the data for the corresponding physical trading card. In some other embodiments, the cross-era sports game system is configured to operate without requiring physical trading cards. In that case, the manager users participating in a non-cards cross-era fantasy sports league engage in game play like they would in a conventional fantasy league in which participants just draft historical players from the past and current players in the present era using statistics retrieved from online or exclusive databases. The cross-era sports game system also stores data for the past and present drafted players in the blockchain.

In this way, the cross-era sports game system offers a new way to play in fantasy sports leagues, by including the full scope of players that have played the games, thereby allowing sports fans to enjoy fantasy sports like never before. For example, a person could have a Michael Jordan—1993 card, a Nolan Ryan—1973 card, or a Brett Favre—1996 trading card. The cross-era sports game system enables the person to substitute legends into the live fantasy game at will and play them alongside current players or other historical players and enjoy a better fantasy experience than having to settle for sub-par players in the free agent pool of current players. The cross-era sports game system enables users to do this for the whole season or until a regular roster player comes back from an injury. This includes substitutions during live games. While current fantasy sports platforms fail to provide a mechanism for live substitutions, the cross-era sports game system of the present disclosure provides live, in-game substitutions as well as out-of-game substitutions of players from a manager's bench to active lineup (or between games). Furthermore, the cross-era sports game system allows substitutions of legendary players for active current players at any time, as well as substitutions of other current players for other active current players. For instance, a current active player in a lineup may get injured during a live game and the manager of the fantasy team with that current active (now injured) player would not like to lose an opportunity to replace the injured player with another bench player for the team—and that substitute coming from the bench, during the live game, may be another current player or may be a legendary player. In this way, all manager users with fantasy sports teams on the cross-era sports game system can maximize their game play.

In some embodiments, the cross-era sports game system is configured for manual set-up and play. The manual version involves human transcription of data for the statistics, game after game, all season, and therefore, is a cumbersome process. By contrast, an easier way is possible by electronic and automatic set-up and play. Specifically, the electronic (or digital) version involves linking data from websites using an API from one or several online databases for all major sports and players to deliver data to a fantasy platform (e.g., Yahoo® or ESPN®) when you play a specific card. In this way, the cross-era sports game system is almost automatic. While the manual version works by manually calculating scores by hand, the digital process automates much of the manual steps of the former by uploading a card into a fantasy bench on a fantasy sports game host platform, selecting that card for the day, and then uploading the player's stats. An additional technical nuance occurs when fantasy managers are setting their lineups and looking at their opponents' lineups before a match-up begins. When playing a game supported by the cross-era sports game system of the present disclosure, however, trading cards are digitally or manually invisible to the opponent until game time, at which point the trading cards are revealed. The cross-era sports game system constrains game play in this way to enrich the overall experience and prohibit cheating.

In some embodiments, the cross-era sports game system solves the problems noted above by using a player from history instead of a weaker player from the free agent pool you improve the fantasy managers experience and help his team with better scores. In some embodiments, the cross-era sports game system uses historical trading cards in place of fantasy free agents that you are forced to pick up when someone on your starting lineup is injured or is in a slump. In other words, replace a below average waiver wire pickup player with a legend from the past at any time. In this way, the cross-era sports game system sheds light on player greatness from the past again by letting fantasy managers, who are also trading card collectors, experience historical player statistics today game by game improving their appreciation for greatness of the past or reinvigorating debate on historical players that maybe were not that good day in and day out. In these fantasy match-ups, managers can also add a trading or wagering dimension by choosing to offer up their cards as a wager to whoever wins the match-up. This adds a new dimension to both audiences (the fantasy manager experience and the trading card collector) by offering a new and exciting way to compete, trade and wager cards, and earn money. For example, if I wager an average card versus an elite trading card that my opponent uses to get great stats for the week, but I win, I just made money from winning a higher valued card. Obtaining an elusive/lucrative trading card is the foundation of excitement upon which trading card collections are built. This is what drives collectors, and now they have a new route. Finally, fantasy managers/trading card collectors can also increase the prices of their collections and cards by trading and selling cards that others can use in their own fantasy games because the historical stats are now coveted for other fantasy manager's rosters and use. So, trading cards become even more lucrative.

Embodiments of the cross-era sports game system described in this specification differ from and improve upon currently existing options. In particular, the cross-era sports game system is based on a unique idea that adds onto an existing game, in a non-obvious way, because no one has thought to use historical players and substitute them into live scoring fantasy match-ups in the present. More specifically, in fifteen plus years that fantasy sports have been around or in the 50+ years of trading cardboard games, no one has thought about using historical trading cards/historical stats in current fantasy formats or games, by way of the actual cards and stats from the exact day and year the cards and players come from. Nor have they considered a way to evaluate a player's trading card or a whole card collection by the actual player statistics year by year to determine which card collector actually has the best players in their trading card collections. Trading cards are graded by condition and rarity at present only. In addition, the existing fantasy sports game systems and platforms are limited in scope or are way too specific and unique to their own game and not scalable, nor are they digital and simple to use. By contrast, the cross-era sports game system of the present disclosure is scalable to the masses of interested people that play fantasy, collect trading cards, or talk sports every year. The cross-era sports game system is also inclusive to all things current and historical, app or board game based, manual or digital. That is how the cross-era sports game system helps sports fans enjoy fantasy and their trading cards like never before, by including the full scope of players that have played the games.

The cross-era sports game system of the present disclosure may be comprised of the following elements.

1. Trading cards (any and all sports) graded or non-graded.
2. Fantasy sports website/platform including external (third party) platforms (e.g., ESPN, Yahoo, or other sites) and an internal (or native) cross-era fantasy sports platform hosted by the cross-era sports game system described in this specification.
3. Databases of historical data from all time players in the NFL, NBA, MLB, NASCAR, or NHL (or other sports in which data for player statistics are available). Typically housed and managed by archive sites.
4. The historical data itself (typically retrieved from archive sites).
5. Mobile device, such as a cell phone (e.g., smartphone) or a tablet computing device, for taking pictures or another mechanism to authenticate ownership and possession of trading cards (e.g., a card collecting catalog app such as iCollectCards, a blockchain that stores images of physical cards and sovereign identity of user who is the card owner and validated by multiple nodes of the blockchain, etc.).
6. Application programming interface (API) connecting historical player statistics to current fantasy sites (e.g., ESPN®, Yahoo®, or other platforms).
7. At least two human game players with fantasy accounts and trading cards.
8. Rules for manual and digital versions of the games (e.g., Legends single player trading card slot game, Legends Trading Card League (card game), and Current (active) player trading cards and fantasy).
9. Blockchain—deployed for each cross-era fantasy sports league/season.

The various elements of the cross-era sports game system of the present disclosure may be related in the following exemplary fashion. Game players select player trading cards from their existing sports card collections each day/week/month/season to use and score the historical data from the day/year in the past respective to each card player, in a minimum of one player spot in a current fantasy sports site, adding together historical player statistics per the card's year and added to their live scores in a current fantasy site with current active players. The historical player's scores add up the same way current fantasy leagues work, namely, with the human fantasy player who scores the most points in each category declared the winner.

The league rules can determine all variations, such as scoring or playing in different fantasy divisions for those who want to score with graded or non-graded historical cards based on card grades or prices, how and when you can use a historical player with current fantasy games, to draft or not draft historical players, roster ownership and activation settings, historical player limits and acquisitions, to use trading cards or use only names/data from the past, to use historical trading cards and current player trading cards as ownership stakes/rights to players, verification of ownership of cards, bonuses from collecting full lineup card sets, or any other standard fantasy rules that could be applied to historical or current players trading cards plus fantasy combinations within fantasy site sports league settings. This also includes historical versus historical players in a trading card collection battle (non-fantasy format), day by day, to see what card collector has the best collections.

The application programming interface (API) or similar data bridge from a historical data site could be used to link data into current fantasy sites for easy/automatic scoring if a more digitally intense process was setup. Data can then be linked to fantasy play/platform through APIs or a similar data bridge for accurate and quick scoring. Manually, a person can leverage a card collection app to digitally house card collections or a blockchain deployment in which all cards are physically authenticated and associated with a true identity of an owner, then it is possible to buy/sell/trade and play the fantasy game or non-fantasy game digitally.

The cross-era sports game system of the present disclosure generally works by a setup stage and a stage for playing the game. For the setup stage, a user would establish the rules and league settings for the game within a current fantasy league or trading card game. League rules can determine a number of variations of game play, such as scoring for graded and non-graded historical cards, utilizing scoring categories for historical/current players (e.g., incorporating scoring bonuses via match-up statistics for lineups like 'Murderer's Row'), determining how and when users can use historical players with current fantasy games in a season, to draft or not draft historical players, roster ownership and activation pre-game or with substitution, historical player limits and acquisitions, to use trading cards (for scoring, wagering, or both) or (alternatively) only require names/data from the past (no requirement for actually having the physical trading card). Users can also use historical trading cards and current player trading cards in combination as ownership stakes/rights to players, verification of ownership of cards, or any other standard fantasy rules that could be applied to historical or current players trading cards plus fantasy combinations within fantasy site sports league settings. In the historical vs. historical players realm, or rather, in a trading card collection battle players play or wager cards or card sets (winner take all) through a digital interface for playing/scoring with immediate results. The key to this match-up is starting with invisible card sets until the game starts, utilizing blockchain for verification, and rules that ensure fair and safe competition. Furthermore, for a historical data only battle, the league can be set to use only the statistics from the past and no cards, to see what card collector or game player has the best collections or team from history.

The stage to Play the Game involves at minimum two human players who select, from their trading card collections, a set of fantasy game players to play in the historical game or draft from a pool of historical players in a historical database without using trading cards and just use historical names/stats. After establishing a team to play with, the users identify players to make active for the first game day/week and then subsequent games, then prepare to play each other (and other competitors) on a fantasy sports site, platform, etc. Alternatively, just use the historical match-up stats and do the same game play via platform, etc. In the game play version that utilizes trading cards, users have the option to make sure their rosters are visible to all competitors and, if necessary, users would verify trading card ownership/player data using an agreed upon system with apps, cellphones (trading images of the cards), blockchain with blocks (or distributed ledger entries) stored for each authenticated card and the sovereign identity of the owner (user), or meet in person, face-to-face, to show the cards to each other (e.g., at a draft party). Now, with active rosters of historical players ready, play the game and start scoring all players on the team through automation or hand calculation in real time or after games are played. For historical players, use the archive statistics site and add up the player's historical stats and translate them to fantasy. Then score using the fantasy sites scoring as already agreed upon and live. For graded cards, add a multiplier based on the cards worth or its card grade (e.g., 8.5 NmMt+ times player score today by 0.085 or $5, 0.5 to score). Substitute historical bench players in and out of the active roster on daily or weekly basis depending on league settings.

To make the cross-era sports game system of the present disclosure, at a very high level there are two ways to play these games, with trading cards or just with the historical stats and players themselves. Trading card versions are more fun to use from a managerial standpoint, but you can use just the digital data of players and stats and enter the information into a scoring system/fantasy site/digital app/board game. To start, identify the players/trading cards that you want to use in your fantasy game or collection versus collection battle. Users have endless options to choose from such as, without limitation, locking a set deck of trading cards before the season starts, or keeping a live bench open for any cards (including cards already won via a mid-season wager) to use as live substitutions. Then, for each day or week of game play inform and "activate" your legendary/historical players to be used for active game play (i.e., using their stats from the same day, x-number of years ago depending on the card date or date drafted for historical players only). For most sports, this is easier to track on a week-by-week or event-by-event basis. Simply stated, one would use the major sports days/weeks that correspond to the current day/week of fantasy sports (e.g., week 10 of 1990 and of current year, The Masters 1980 and 2021).

You can also use the statistics provided on the trading cards themselves for scoring (yearly, lifetime, etc.). Simply take these statistics from historical players and apply them to your current fantasy match-ups using the current fantasy scoring options (ERA, HRs, TDs, assists, etc.). This can be done digitally/electronically through online fantasy, statistic databases, and computer processes (like APIs) to serve the data from one site to another. The digital/electronic version would involve the use of computing devices such as computers with applications or browser connecting to the website of a platform, or via mobile device, smartphone, etc., on a mobile app. It is also possible manually through writing the calculations and texting out the results. Trading card bonuses of any type can also be incorporated in to factor in player trends compared to certain opponents, like Nolan Ryan versus Robin Ventura. Since Nolan Ryan historically and consistently dominated the "mano a mano" match up with Robin Ventura, the cross-era sports game system of the present disclosure would reflect this by ensuring that a bonus is rewarded every time the Nolan Ryan card is played against the Robin Ventura card, given the dominance Nolan Ryan exerted in their previous encounters. Such statistics and trends are knowable and offer a deeper dive for users who want to add this dimension.

To use the cross-era sports game system of the present disclosure, a person could use a trading card collection, or the historical players and stats to see which collector or fantasy team has the best players. Alternatively, a person would battle card collections with another collector to see who has the best cards in addition to card condition, rarity, etc. This is a way to prove who is the greater player in a battle for greatest of all-time (GOAT) and battle it out across all years within a sport.

By way of example, FIG. 1 conceptually illustrates a high-level schematic of a cross-era sports game system 100. As shown in this figure, the cross-era sports game system 100 includes a card 110, a blockchain 120, an application 130, a fantasy sports application or website 140, an application programming interface (API) 150, and a plurality of sports archive sites 160. The cross-era sports game system 100 shown in this figure demonstrates the relationships between the various components. For instance, the card 110 relates to the application 130 (on a device) which the user interacts with to participate in a cross-era sports game hosted by the fantasy sports application/website 140. Similarly, the fantasy sports application/website 140 retrieves relevant sports information (e.g., statistics) from a particular sports archive site in the plurality of sports archive sites 160. The particular sports archive site would be the sports archive site related to the cross-era sports game being played by the user and other participants. For instance, if the cross-era sports game is baseball, the relevant sports archive site 160 would be the 'MLB Archive Site' shown here, but if basketball were the sport of the cross-era sports game being played, the relevant sports archive site 160 would be the 'NBA Archive Site'. Similarly, the card 110 would feature a player from the sport associated with the sports archive site 160. In this figure, where the card 110 illustrates a basketball player, the sports archive site 160 accessed via the API 150 would be the 'NBA Archive Site'.

Depending on implementation and deployment, the card 110 may be a physical trading card that is scanned by a manager user who uploads the scanned digital image of the physical trading card 110 to the fantasy sports application/website 140 to use as a roster player for the manager user's fantasy team. In some embodiments, physical verification or proof of possession of the trading cards used by each manager user is set as a required prerequisite for play (as agreed by all manager users for the league rules). In some embodiments, physical verification can be in the form of a live, in-person draft party in which all manager users bring the physical trading cards to the draft party for other manager users to see. In some embodiments, appraisals and certifications of authenticity are set out in the rules for the fantasy league as being required for any physical trading card utilized in a roster of a fantasy team. In that case, the manager user may obtain the appraisal/certification of authenticity from an approved appraisal service (as agreed by all manager users in the rules for the league) and upload both the appraisal/certification and the physical trading card 110 to the fantasy sports application/website 140 for inclusion in the manager user's fantasy team roster. Details of appraisal and certification of authenticity of physical trading cards are described in more detail below, by reference to FIG. 5.

The blockchain 120 is configured as a secure and immutable storage of roster data, transactions, statistics, match-ups, and ownership of assets (either physical trading cards or non-card players as drafted), trades, transactions, and events such additional or removal of players from a given roster, promotions of roster players from bench to active lineup, demotions of roster players from active lineup to bench, etc. The blockchain 120 shown here may be deployed with an architecture that is configured to operate as a stake card-based proof-of-stake blockchain, a token-based proof-of-work blockchain, or a credentials-based proof-of-authority blockchain. Examples and details of proof-of-stake blockchain deployments are described below, by reference to FIGS. 3-4 and 6.

The application 130 is software application that provides an interface for manager users to interact with the fantasy sports application/website 140 and participate in game play for the fantasy sports league/season. The application 130 may be installed on a computing device, such as a mobile app that runs on a mobile device of a user. The application 130 is configured to perform scanning of the physical trading cards by operation of an onboard camera (e.g., a camera of a smartphone) or by operation of an externally connected camera (e.g., a web camera connected to a computing device operated by the user, a conventional scanner or printer/scanner machine, etc.). The digital images that result from scanning the physical trading cards are then queued up by the application 130 to upload to the fantasy sports application/website 140. An example of user tools for uploading digital images of physical trading cards is described below, by reference to FIG. 6.

The fantasy sports application/website 140 is a system that is configured to host fantasy sports leagues and provide interfaces and tools for engagement by players (e.g., users, managers) in seasonal play, head-to-head match-ups, and other cross-era fantasy sports play. The fantasy sports application/website 140 may be a cloud application platform service hosted by the cross-era sports game system or may be a third party platform accessible to the cross-era sports game system via network connection (e.g., Internet, wireless, cloud access, etc.). An example of a cloud-based fantasy sports application platform service hosted by a cloud-based cross-era sports game system is described below, by reference to FIG. 7.

The API 150 provides access for the fantasy sports application/website 140 to access data, statistics, and other information pertaining to players in the active sport for any given cross-era fantasy sports league formed and played in by participating manager users. Note that the API 150, which refers specifically to one or more application programming interface(s), may also refer to a similar kind of data transmission bridge, which may be a plug-in, a full-fledged software application, a web application, an interface, etc. While the plurality of sports archive sites 160 illustrated in FIG. 1 only demonstrates three different archive sites related to three different sports (i.e., 'MLB Archive Site' for baseball, 'NFL Archive Site' for football, and 'NBA Archive Site' for basketball), the plurality of sports archive sites 160 may include many other archive sites for other sports, other leagues, etc. Furthermore, the API 150 itself is sufficiently expansive to be able to retrieve sports statistical data from other archive sites beyond the plurality of sports archive sites 160 demonstrated in this figure, whatever the sport may be for any given cross-era fantasy sports league being played. For example, the API 150 may include interface language bindings that permit data retrieval from foreign sports or other archive sites. An example of an API gateway that is configured to retrieve data from domestic, foreign, and other third party archive sites is described below, by reference to FIG. 7.

Figure 2:
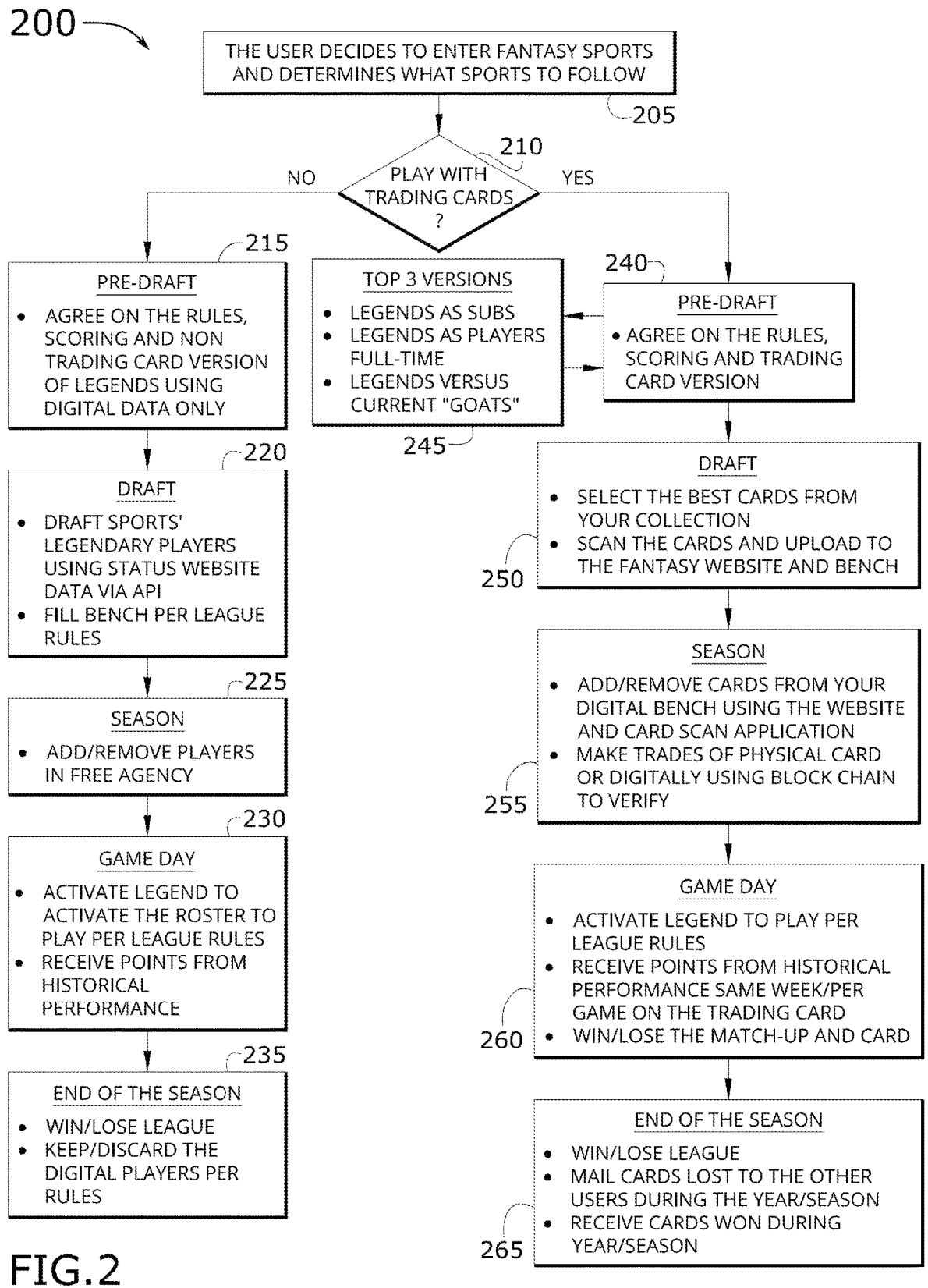
FIG. 2 conceptually illustrates a cross-era sports game participant engagement process in some embodiments.

Turning to another example, FIG. 2 conceptually illustrates a cross-era sports game participant engagement process 200. The cross-era sports game participant engagement process 200 is performed by each participant (or "user") intending to actively participate in a cross-era fantasy sports league, season, game, or other match-up. As shown in this figure, the cross-era sports game participant engagement process 200 starts when a user decides to enter or join in fantasy sports play that offers cross-era fantasy sports games for participants. At this stage, the user determines which sport(s) to follow (at 205). In some embodiments, the cross-era fantasy sports games are offered as playable cross-era sports games in which physical sports cards are used or, alternatively, where digital player data of virtual digital cards (no physical cards) are used instead. Thus, the cross-era sports game participant engagement process 200 determines whether the user intends to engage in physical trading cards fantasy sports play or non-trading cards fantasy sports play. When the user chooses to engage in trading cards-based fantasy sports play, the cross-era sports game participant engagement process 200 performs a trading cards process, which is described further below. However, when the user chooses to engage in non-trading cards fantasy sports play, the cross-era sports game participant engagement process 200 performs a non-trading cards process, which is described next.

The non-trading cards process performed by the cross-era sports game participant engagement process 200 starts at a pre-draft stage (at 215). During the pre-draft stage (at 215), manager users agree on rules for the fantasy league, scoring method(s) to use, and also agree that the fantasy league will not require physical trading cards for historical players/legends of the sport, but instead will use virtual digital player cards and statistics of the players.

Next, the non-trading cards process moves forward to a draft stage (at 220) during which manager users draft the legendary (historical) players they want for their roster (both active lineup and bench players). The draft involves typical selection through user interfaces, such as those provided via the application 130, described above by reference to FIG. 1. Such selections of legendary players trigger the API to retrieve the corresponding data for the selected players from the appropriate archive site. The draft stage (at 220) continues until all manager users in the league have drafted enough players to fill an active lineup for the sport as well as a bench of players, the number of which may be agreed upon by the manager users in the rules during the pre-draft stage (at 215).

Next, the non-trading cards process proceeds to the season stage (at 225). During the season stage (at 225), the manager users engage in typical fantasy sports transactions, such as adding and removing players in free agency, trading players with other manager users, etc. As the non-trading cards process does not require physical trading cards of the transacted players to be possessed by any of the manager users, all that is needed is to transfer information about the players between manager users or retrieve data, statistics, and other information about legendary players from one or more of the archive sites via API. However, as is described in greater detail below, by reference to FIGS. 3-4 and 6-7, all transactions during the season would be recorded in the blockchain to provide an immutable record of the season's fantasy sports league play.

Also, the non-trading cards process may carry out operations and actions from individual game day stages (at 230) that occur during the season. As shown, the game day stage (at 230) includes actions to (i) activate legends to play in the active line-up of the roster (as permitted by league rules) and (ii) receive points (or tokens) from historical performances of the active legends on the corresponding date in history associated with the game day.

While the game day stage (at 230) may repeat many times during the season stage (at 225), once the season is completed the non-trading cards process performed by the cross-era sports game participant engagement process 200 proceeds to the end of the season stage (at 235). At the end of the season stage (at 235), the winning and losing manager users (via points or tokens) for the non-cards fantasy sports league are determined. Also during the end of the season stage (at 235), the manager users are permitted to keep or discard the virtual digital cards of the players on their team, when allowed per league rules.

Turning back to the determination (at 210), when the user chooses to engage in trading cards-based fantasy sports play, the cross-era sports game participant engagement process 200 performs a trading cards process in which physical trading cards are provided by manager users seeking to fill their roster entirely with historical players or to supplement a current player draft with historical players, the cards of which they possess. As in the non-trading cards process described above, the trading cards process starts at a pre-draft stage (at 240).

In some embodiments, the manager users can select one of several pre-configured trading card versions or can choose a custom trading card version of their own design. When the manager users opt for a pre-configured trading card version, the trading cards process presents (at 245) the several pre-configured trading card versions to the manager users (through the application interface). In this figure, the manager users can choose from a 'legends as substitutes' version, a 'legends as players full-time' version, and a 'legends versus current GOATs' version. After the manager users select one of the versions, the trading cards process performed by the cross-era sports game participant engagement process 200 moves on to the draft stage (at 250). On the other hand, if the manager users have not selected a pre-configured version, but have instead opted to keep their game play open-ended, then the trading cards process skips the version selection stage (at 245) and proceeds directly to the draft stage (at 250) after completing the pre-draft stage (at 240).

During the draft stage (at 250), each manager user selects the physical trading cards, which they possess in their collection of cards, they intend to use for players in their fantasy team roster (both bench and active). Typically, manager users will choose physical trading cards featuring the best players in the sport or, more specifically, the players with the best performances during a single season in which the physical trading card was issued. However, the cross-era sports game participant engagement process 200 in no way requires the manager users to select their 'best' players/cards. In any event, the manager users also scan the physical trading cards they have selected to use and then upload digital images of the selected physical trading cards to the fantasy sports application/website 140 to fill out their team roster, for both active lineup and bench.

Next, the trading cards process performed by the cross-era sports game participant engagement process 200 proceeds to the season stage (at 255). During the season stage (at 255), the manager users engage in typical fantasy sports transactions, such as adding and removing players from their team rosters. This involves interaction by the manager users through the fantasy sports application/website 140 to select players to remove, and also requires the manager users to scan physical trading cards corresponding to players they are adding to the roster, followed by uploading the scanned digital images. Where appraisal/certification of authenticity is required (per league rules), the appraisal/certification associated with each digital image of a physical trading card would also be uploaded to the fantasy sports application/website 140. Furthermore, manager users can make trades of physical trading cards during the season, which would then result in a change in rosters for the manager users reflecting the change in possession of the physical trading cards enacted by the trade. When such trades occur, the physical trading cards themselves may be physical exchanged between the trading manager users. However, there is no requirement that a physical exchange of trading cards needs to occur before or contemporaneously with the logical, game-driven activation of the trade in the rosters of the manager users because the immutable ledger provided by the blockchain would record the trade and make note of the respective current owners of those physical trading cards. In this way, the physical exchange of the trading cards associated with the trade may occur at season's end or other time(s) as agreed. Furthermore, league rules may be agreed upon by all manager users specifying requirements for the exchange of physical trading cards corresponding to the logical, fantasy league trades of legendary players. Blockchain implementations are described in greater detail below, by reference to FIGS. 3-4 and 6-7.

As the season continues, the trading cards process may handle multiple game day scenarios. This is shown during the game day stage (at 260). As shown in this figure, game day scenarios include, without limitation, activating a legendary historical player to play in a game today (as permitted by league rules), receiving points or tokens based on the historical performance of the legendary player during the particular game day or week from the season in which the physical trading card of the legendary player was issued which corresponds to the same current game day or week, and/or engaging in match-ups, such as head-to-head match-ups, to win/lose points, tokens, and/or the physical trading card. In the event that match-up is performed, each manager user engaging the match-up would offer a stake for the match-up. The stake may be a match-up stake card which is the same physical trading card as that which relates to the legendary player whom is chosen by the manager user to compete in the match-up, or may be a number of points or tokens the manager user may be willing to lose (to another manager user) or win (from the other manager user) based on the historical performance of each manager user's legendary player selected for the match-up, and specifically related to their performances for the given game day or week.

While the game day stage (at 260) may repeat many times during the season stage (at 255), once the season is completed the trading cards process proceeds to the end of the season stage (at 265) where the winning and losing manager users are determined and physical trading card exchanges occur (such as by hand-delivering or mailing the physical trading cards lost to other manager users and receiving the physical trading cards won during the season via mail or manual delivery).

While the cross-era sports game participant engagement process 200 delves into a general non-trading cards process and a general trading cards process, several technical processes for carrying out the steps and operations of these general processes are described next, by reference to FIGS. 3-5.

Figure 3:
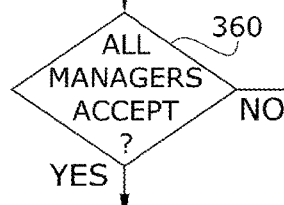
FIG. 3 conceptually illustrates an informal cross-era fantasy sports trading cards league process in some embodiments.

By way of example, FIG. 3 conceptually illustrates an informal cross-era fantasy sports trading cards league process 300. The informal cross-era fantasy sports trading cards league process 300 is performed as a trading cards process in which league rules do not require appraisals or certifications of authenticity of the physical trading cards which manager users upload for their rosters. Also, even though informal cross-era fantasy sports trading cards league process 300 relates to fantasy sports play in which participants possess the actual physical trading cards for their rosters, it should be understood that the technical steps involved in the informal cross-era fantasy sports trading cards league process 300 could be applied to the non-trading cards process performed by the cross-era sports game participant engagement process 200, described above by reference to FIG. 2, with adaptions in which users offer up a number of tokens or points as their 'stake' instead of one or more 'stake cards' as is described below.

Also, the informal cross-era fantasy sports trading cards league process 300 includes several technical processing steps involved in recording all of the relevant fantasy sports league data to a blockchain that is implemented (in this example) as a proof-of-stake (PoS) blockchain deployed for the informal trading cards fantasy sports league. However, the technical steps involved in blockchain data recording and maintaining an immutable ledger for the fantasy sports league could be applied to other blockchain implementations, such as proof-of-work (PoW) blockchains and proof-of-authority (PoA) blockchains, with tokens/points being rewarded for writing blocks to the blockchain based on a first node to demonstrate a solution to a work problem (PoW), or authority credentials being compared for the right to add blocks of data to the blockchain and be rewarded the points/tokens (PoA).

As shown in this figure, the informal cross-era fantasy sports trading cards league process 300 starts when a particular user joins or forms an informal trading cards fantasy sports league host by a fantasy sports portal (at 310). The informal cross-era fantasy sports trading cards league process 300 proceeds to the next step at which all managers and the particular user agree on the rules for the league/season, scoring method(s) to utilize, and an affirmative agreement that the league requires possession of the physical trading cards which each manager user scans and uploads for their roster (at 320). In some embodiments, a threshold number of manager users need to join the league before the rules, scoring method(s), and so forth are discussed/agreed to.

In some embodiments, the informal cross-era fantasy sports trading cards league process 300 proceeds to a step during which the particular user scans the physical trading cards in their possession and uploads the resulting digital images to the fantasy sports portal. The digital images of the physical trading cards are uploaded by the particular user to fill out the roster of their fantasy sports team. All manager users do the same process of scanning and uploading the digital images of their own (possessed) physical trading cards.

Next, the informal cross-era fantasy sports trading cards league process 300 proceeds to a step in which the particular user selects one of the trading cards as a season 'stake' card (at 340). The stake card is a physical trading card which the particular user offers up as evidence that they are providing a sufficient stake for playing in the fantasy sports league. The particular user may lose the stake card (physical trading card) at the end of the season to a winning manager user. Thus, the stake card demonstrates a certain value which, if accepted as a sufficient stake by all the other users in the league, provides a proof-of-stake for the particular user to be validated as a self-writing node that is technically permitted to write transaction blocks in the PoS blockchain deployed for the informal trading cards fantasy sports league (such as transaction blocks that declare the ownership of the physical trading cards uploaded by the particular user and utilized for the particular user's team roster). In some embodiments, a smart contract for the blockchain provides the rules that permit or deny the particular user transaction block writing permissions (and the same permit/deny for any other manager user in writing blockchain blocks).

After the particular user selects the season stake card, the informal cross-era fantasy sports trading cards league process 300 proceeds to a step at which all the other manager users need to accept the season stake card offered by the particular user (at 350). The particular user will simply not be validated as a node with permissions to write transaction blocks to the blockchain without the other users accepting the stake card as being sufficient for game play. In this example, the criteria which the PoS blockchain and corresponding smart contract employs is a required that all other manager users accept the particular user's stake card. However, the criteria is ultimately defined by league rules (as agreed by all users). Thus, league rules may require users to select all of the physical trading cards as their 'stake' or just some number of physical trading cards (more than one) as their 'stake'. Furthermore, the league rules may define the smart contrast to only require a majority of the other manager users to accept a particular stake card (stake cards) or some other criteria. Similarly, the league rules may define the smart contract to require one or more stake card(s) that is accepted by the required number of other users and also to offer up a number of tokens or points to add to the stake, before an acceptance by the other users is actuated. Again, the particular requirements for what constitutes a sufficient stake that permits the computing devices of users to be authorized as self-writing nodes permitted to write their own transaction blocks to the blockchain can be discussed, selected, and agreed by all users in the league rules.

Taking the exemplary requirement that all other manager users must accept the particular user's physical trading card as the season 'stake card', the informal cross-era fantasy sports trading cards league process 300 proceeds to the next step to determine (at 360) whether all other manager users have accepted the season stake card offered by the particular user. When at least one manager user rejects the season stake card, the particular user would not be authorized to write the transaction block(s) in the blockchain for their roster of players and other such data. In practical terms, that means the particular user would not be a participant in the season for the informal trading cards fantasy sports league, at least until another stake card is provided and accepted by all other manager users.

Thus, the informal cross-era fantasy sports trading cards league process 300 proceeds to a step at which the particular user selects a different season stake card (at 370). At this point, the particular user may select another physical trading card (or digital image as uploaded) from the existing roster, or may seek to scan and upload a different physical trading card to use as a stake card. In that case, the particular user would also select on digital image of a physical trading card in their team roster to remove, thereby providing a roster opening for the newly scanned and uploaded digital image of the different physical trading card. Thus, after the particular user selects a new stake card, the informal cross-era fantasy sports trading cards league process 300 transitions back to the step at which all the other manager users need to accept the (newly selected) season stake card offered by the particular user (at 350), and continuing forward as described above.

Note that a possible problem of never achieving a full consensus of manager users accepting a stake card may occur. However, in practice, this is unlikely since users who exert the effort to join the informal trading cards fantasy sports league and hammer out the league rules are already sufficiently interested in engaging in actual fantasy sports play. Nevertheless, in some cases there could be user who is simply 'out-classed' in terms of the stake they can offer compared with other users who joined the league. For instance, users with physical trading cards that typically appraise in value above one-thousand dollars each may provide stake cards that are commensurate with the other users, but if one of the users only possesses physical trading cards that appraise in value below one-hundred dollars, the other users may never be able to accept any of those cards as a sufficient stake card. Those high-roller manager users may seek to form a different informal cross-era fantasy sports trading cards league, or the under-classed user may seek out a different informal cross-era fantasy sports trading cards league to join. In the end, offering a proof-of-stake that is sufficient stake for the other users provides at least two underlying keys to running (informal or formal) cross-era fantasy sports trading cards leagues: sufficient stake to ensure manager users engage in the league with sufficient effort, and sufficient stake to ensure that transaction block writing is efficient (no need to solve intensive problems that require massive processing power) and honest by authorized self-writing computing device nodes operated by the respective manager users who offer the sufficient stake card(s).

Now turning back to the determination (at 360). When a determination (at 360) is made that all other manager users have accepted the season stake card offered by the particular user, the informal cross-era fantasy sports trading cards league process 300 proceeds forward to the next step. Specifically, the computing device of the particular user is verified as a validating node of the blockchain at this step (at 380), which allows the particular user to 'submit' the digital images of the physical trading cards in their roster to the blockchain. In practice, the particular user selects an interface button or tool in the application to 'submit' all the data for the roster, including digital images of the physical trading cards, user ID, etc. The application then performs the actual creation of new blockchain block(s) with the data and adding the new block(s) to the end of the blockchain, thereby recording the particular user's ownership of the physical trading cards associated with the roster card images and data. In some embodiments, the scanned physical trading cards are minted as non-fungible tokens (NFTs) and written to the blockchain. Even when different manager users provide a particular trading card that is the same year, player, and relative condition or rating, NFT minting can provide the fundamental proof of ownership for each particular card, with possible subsequent trades being recorded to the blockchain for those trading card NFTs involved in the trades. For example, if two manager users provide the same Hank Aaron rookie card for their respective roster, the corresponding NFTs for those cards could be distinguished by other metadata recorded in the NFT, such as owner ID (or manager user ID), or other unique identifier. Also, it would be possible for one of the manager users to acquire both Hank Aaron rookie card NFTs (e.g., by trade, by winning a type of match-up, etc.) and potentially use both Hank Aaron rookie cards simultaneously as separate fantasy players in their active line-up for a game, a week, or longer.

As might be expected, each individual manager user performs the same series of steps to offer a season stake card, have it considered (and accepted) by the other users, and then write the roster and physical trading card ownership transaction block(s) in the blockchain as authorized self-writing nodes. After the particular user and all other manager users in the informal cross-era fantasy sports trading cards league have recorded their rosters (and associated data) to the blockchain, the informal cross-era fantasy sports trading cards league process 300 moves forward to a step at which the season starts for the informal cross-era fantasy sports trading cards league (at 390). Play continues throughout the season, with the verified self-writing nodes actively writing their transaction blocks to the blockchain, thereby leaving an immutable record which, by the end of the season, can be traced through to determine ownership of the physical trading cards and requirements for physical exchange of cards as needed.

Figure 4:
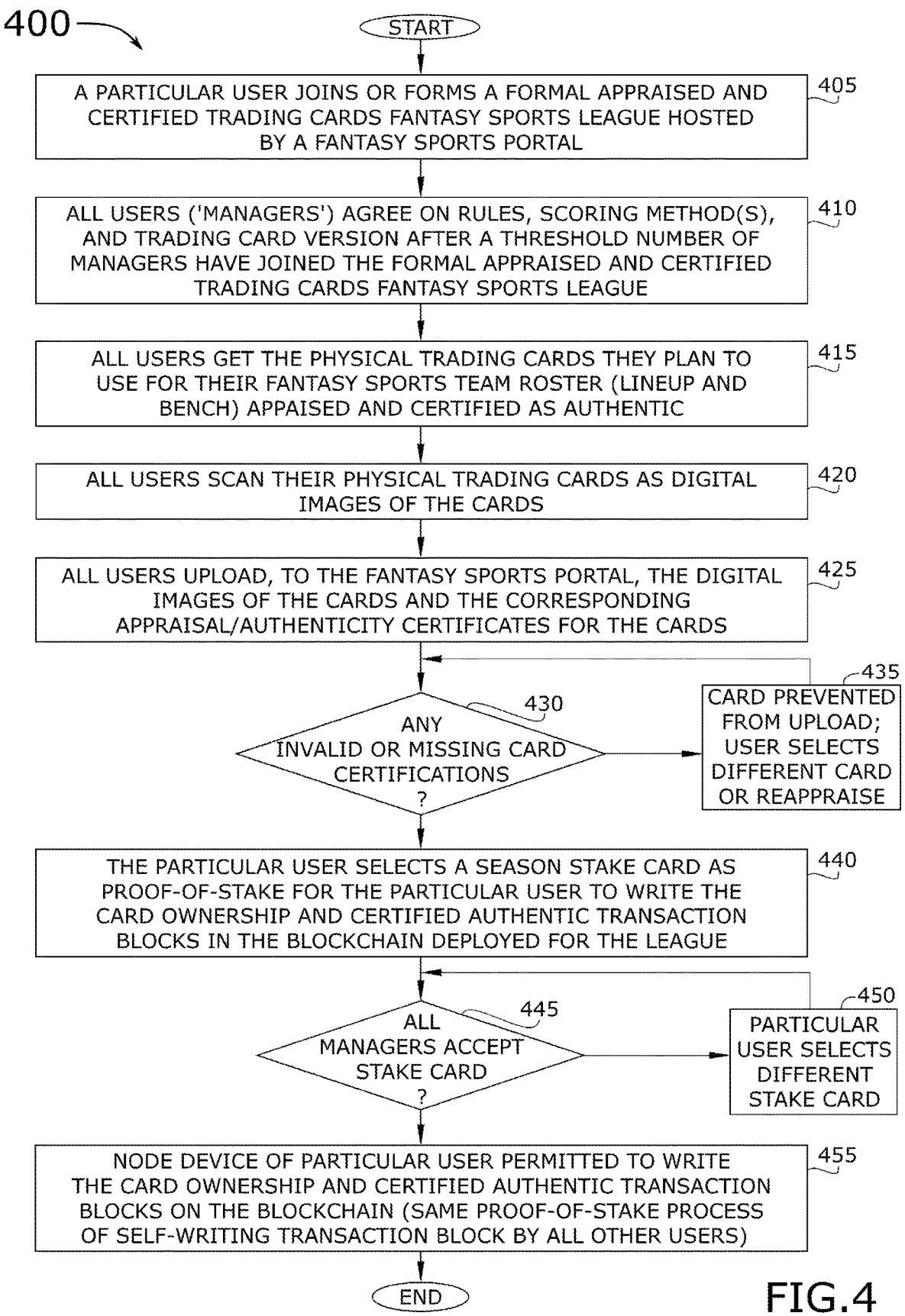
FIG. 4 conceptually illustrates a formal, appraisal-based cross-era fantasy sports trading cards league process in some embodiments.

Turning now to another example, FIG. 4 conceptually illustrates a formal, appraisal-based cross-era fantasy sports trading cards league process 400. The formal, appraisal-based cross-era fantasy sports trading cards league process 400 is performed as a trading cards process—where manager users possess the physical trading cards associated with their roster of historical players and in which league rules do require appraisals and certifications of authenticity of the physical trading cards which manager users upload for their rosters.

Also, formal, appraisal-based cross-era fantasy sports trading cards league process 400 involves a technical process of recording the relevant fantasy sports league data to a PoS blockchain, similar to the technical process involved in the informal cross-era fantasy sports trading cards league process 300, described above by reference to FIG. 3. While the formal, appraisal-based cross-era fantasy sports trading cards league process 400 refers the PoS blockchain, the technical process may be implemented with another form of blockchain data recording, such as through PoW blockchains and/or PoA blockchains.

In some embodiments, the formal, appraisal-based cross-era fantasy sports trading cards league process 400 starts when a particular user joins or forms a formal appraised and certified trading cards fantasy sports league (at 405) which is hosted by a fantasy sports portal. When a threshold number of manager users have joined the league, all users determine and agree on the rules, scoring method(s), and affirmatively agree that the league is a trading cards version in which physical trading cards must be possessed by the users to use in filling out their rosters and must be appraised and certified as authentic (at 410).

In some embodiments, the formal, appraisal-based cross-era fantasy sports trading cards league process 400 proceeds to a step at which the users get their physical trading cards (which they plan to use for their fantasy sports team roster, both active lineup and bench) appraised and certified as authentic (at 415). For example, users may take their physical trading cards to an appraisal service for certification, or may mail the physical trading cards to such an appraisal service. Details of an exemplary trading cards appraisal and authenticity certification process are described further below, by reference to FIG. 5.

After receiving appraisals and certifications of authenticity, the users scan their physical trading cards as digital images of the cards (at 420). The scanned digital images of the cards may be combined with digital appraisals and authenticity certifications, when already in digital form. Otherwise, any appraisal/certification of authenticity is the form of a physical medium may be scanned or captured as a digital image and combined with the digital image of the associated physical trading card.

Next, the formal, appraisal-based cross-era fantasy sports trading cards league process 400 continues forward to a step at which the users upload the digital images of their physical trading cards and the corresponding appraisal/certifications of authenticity to the fantasy sports portal (at 425). The formal, appraisal-based cross-era fantasy sports trading cards league process 400 does not perform the step for uploading (at 425) simultaneously for all users. Instead, this step for uploading (at 425) is carried out by direct user action in which each individual user in the fantasy sports league interacts with the application on their device to upload the digital images of their physical trading cards, along with the digital appraisals and certifications of authenticity associated with those cards. Thus, the formal, appraisal-based cross-era fantasy sports trading cards league process 400 may be understood to be a staggered process in which the steps of the process are not performed in one continuous series or in one particular timed sequence, but is user driven. Nevertheless, the formal, appraisal-based cross-era fantasy sports trading cards league process 400 does demonstrate the conceptual steps of the technical process that occurs.

After any given user (e.g., the particular user) has completed the step for uploading, to the fantasy sports portal, the digital images of the cards and the corresponding appraisals/certifications of authenticity (at 425), the formal, appraisal-based cross-era fantasy sports trading cards league process 400 of some embodiments determines (at 430) whether the batch of uploaded data includes an invalid appraisals/certifications of authenticity or any digital images of physical trading cards that lack corresponding (missing) appraisals/certifications of authenticity. For example, the user uploading the digital images of the cards may have obtained appraisals/certifications of authenticity from an authorized appraisal service, per league rules, or there may be one or more digital images of cards which do not include a corresponding digital appraisal/certification of authenticity due to user error or a transmission failure or another reason.

When it is determined (at 430) that there are no invalid or missing card certifications, the formal, appraisal-based cross-era fantasy sports trading cards league process 400 proceeds to the next step for selection of a season stake card (at 440), which is described further below. However, when any invalid or missing card certification is detected (at 430), then the formal, appraisal-based cross-era fantasy sports trading cards league process 400 proceeds to a step for preventing upload of the digital image of the physical trading card associated with the invalid or missing certification (at 435). In some embodiments, the formal, appraisal-based cross-era fantasy sports trading cards league process 400 notifies the user of the invalid or missing certification and prompts the user to do at least one of two actions (at 435). In some embodiments, the formal, appraisal-based cross-era fantasy sports trading cards league process 400 prompts the user to select (at 435) a digital image of a different physical trading card to upload, along with the corresponding appraisal/certification of authenticity for that different physical trading card or get a re-appraisal (at 435) of the digital image of the original (upload prevented) physical trading card. Then the formal, appraisal-based cross-era fantasy sports trading cards league process 400 transitions back to the step for determining (at 430) whether the newly selected digital image of the different physical trading card and corresponding appraisal/certification of authenticity or the re-appraised version of the original physical trading card include any invalid/missing appraisal/certification of authenticity.

Now referring to the step for selection of a season stake card (at 440), the particular user at this stage has uploaded all digital images of the physical trading cards intended to be used in fleshing out the team roster, as well as uploaded all corresponding (valid) appraisals and certifications of authenticity for the cards. Now the particular user performs a step of the formal, appraisal-based cross-era fantasy sports trading cards league process 400 to select a season stake card (at 440) from among the uploaded cards. The selection of the season stake card by the particular user is offered as a proof-of-stake for the particular user to write the physical trading card ownership and certified authentic transaction block(s) in the blockchain deployed for the formal, appraisal-based cross-era fantasy sports trading cards league. As described above, by reference to FIG. 3, selection of a season stake card would be performed by all the users.

After the particular user selects the season stake card, the formal, appraisal-based cross-era fantasy sports trading cards league process 400 determines (at 445) whether all other manager users in the formal, appraisal-based cross-era fantasy sports trading cards league accept the season stake card offered by the particular user. When there is a lack of consensus in accepting the particular user's season stake card, the formal, appraisal-based cross-era fantasy sports trading cards league process 400 moves on to step at which the particular user selects a different stake card (at 450) and allows the other manager users to consider it for acceptance.

On the other hand, when the season stake card selected by the particular user is affirmatively accepted by the other users, then the formal, appraisal-based cross-era fantasy sports trading cards league process 400 moves to the next step at which the node computing device operated by the particular user is authorized and permitted to write the card ownership and certified authentic transaction block(s) on the blockchain for their roster data (at 455). The same proof-of-stake process of offering a season stake card and obtaining consensus acceptance from the other manager users is performed by all users, until all the users have uploaded their respective team rosters and all such data has been securely self-written to the blockchain.

As noted above, the step at which users get their physical trading cards appraised and certified as authentic (at 415) involves a trading cards appraisal and authenticity certification process, an example of which is described next, by reference to FIG. 5.

Figure 5:
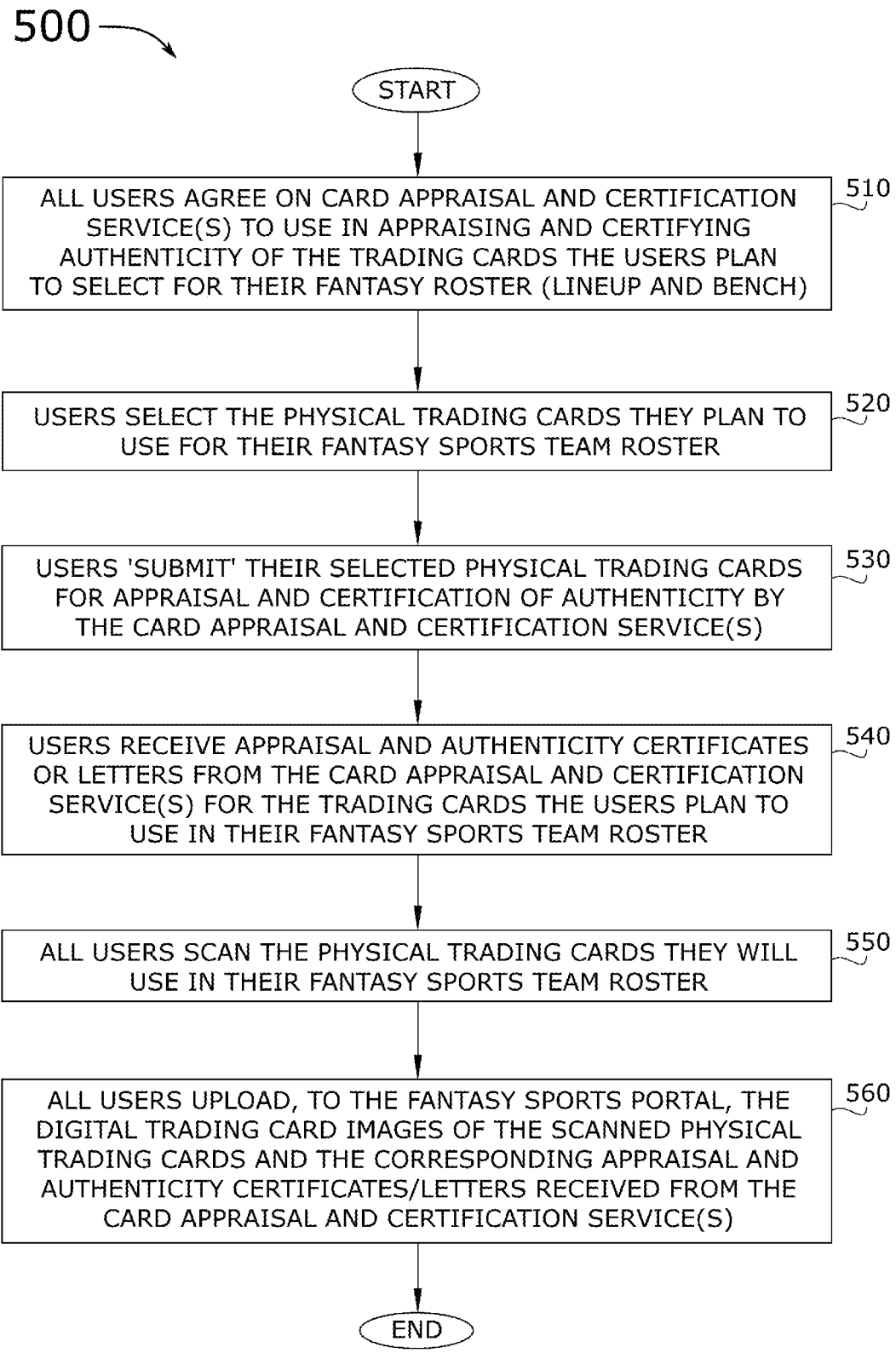
FIG. 5 conceptually illustrates a trading cards appraisal and authenticity certification process for rating and certifying trading cards in the rosters of manager users participating in a formal, appraisal-based cross-era fantasy sports trading cards league in some embodiments.

Specifically, FIG. 5 conceptually illustrates a trading cards appraisal and authenticity certification process 500 for rating and certifying trading cards in the rosters of manager users participating in a formal, appraisal-based cross-era fantasy sports trading cards league. As shown in this figure, the trading cards appraisal and authenticity certification process 500 starts with a step in which all users agree on one or more card appraisal and certification service(s) to use in appraising and certifying authenticity of the physical trading cards the users plan to select for their fantasy team roster (510). Then, as each user selects the physical trading cards they plan to use for the fantasy sports team roster (at 520), the user 'submits' their selections of physical trading cards for appraisal and certification of authenticity (at 530) to the card appraisal and certification service(s). Submitting the selected cards by the user can take any ordinary form, such as (without limitation) manually delivering the physical trading cards to a physical site of the card appraisal and certification service(s), mailing the physical trading cards to the card appraisal and certification service(s), or submitting digital images of the physical trading cards and other evidentiary information to an online service provided by the card appraisal and certification service(s).

After submitting the cards for appraisal and certification of authenticity, the trading cards appraisal and authenticity certification process 500 moves to the next step during which users receive the appraisal and authenticity certificates or letters from the card appraisal and certification service(s) for the physical trading cards the users plan to use in their fantasy sports team roster (at 540). After each user receives the appraisal and authenticity certificates or letters from the card appraisal and certification service(s), the user scans their physical trading cards as digital images of the same and (if needed) scans the appraisal and authenticity certificates or letters to combine with the digital images of the physical trading cards of the user (at 550). After each of the users completes the scanning of their physical trading cards and combining the digitized appraisal and authenticity certificates or letters with the digital images of their respective cards, the trading cards appraisal and authenticity certification process 500 proceeds to a final step at which each user uploads, to the fantasy sports portal, the digital images of their respective physical trading cards and the corresponding appraisal and authenticity certifications or letters (at 560) received from the card appraisal and certification service(s).

Figure 6:
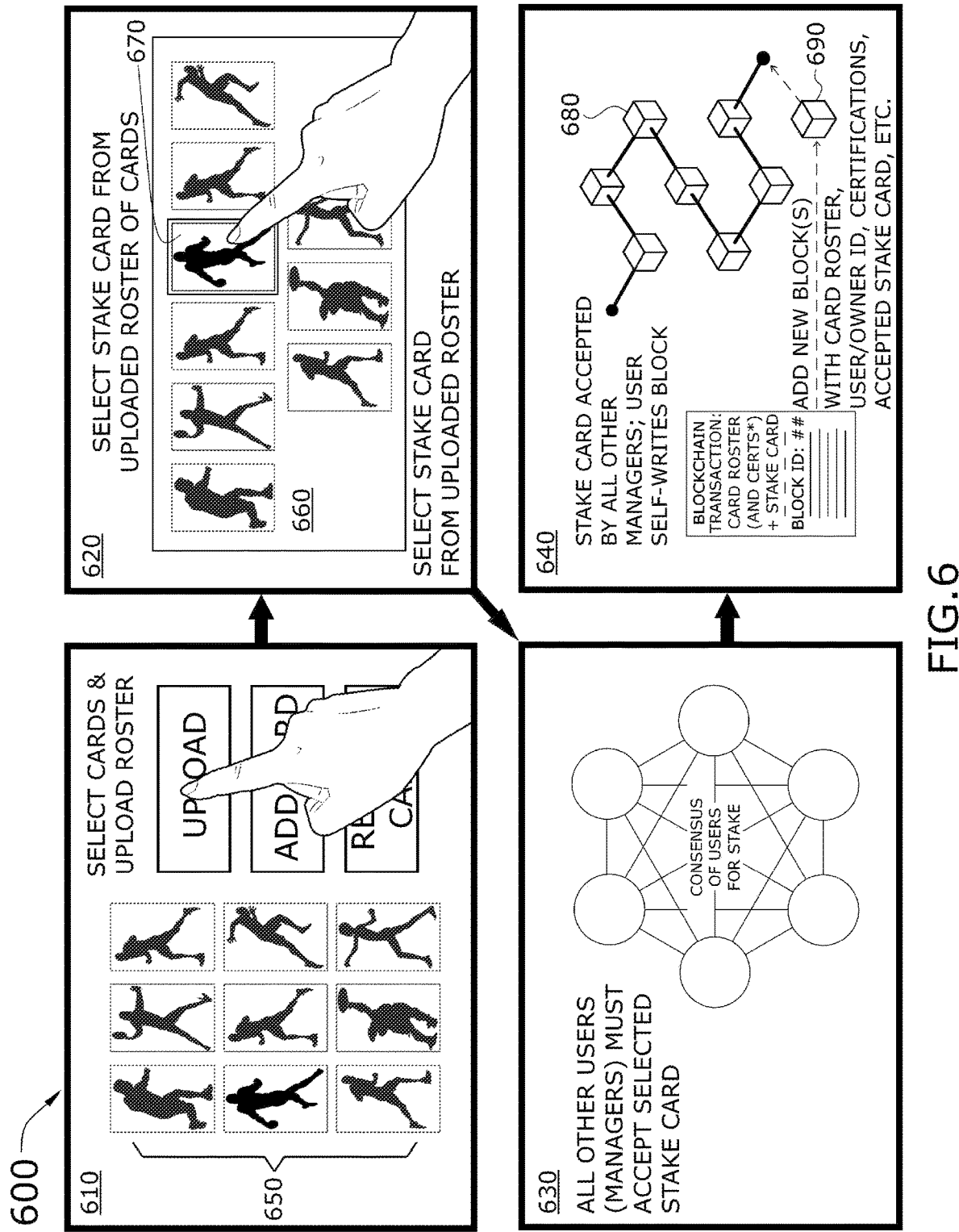
FIG. 6 conceptually illustrates a phase diagram that demonstrates an example of uploading a roster of trading card images, selecting a stake card, validating the stake by other users, and writing the ownership information, card information, and roster details to a blockchain deployed for a cross-era fantasy sports trading cards league in some embodiments.

By way of another example, FIG. 6 conceptually illustrates a phase diagram 600 that demonstrates an example of uploading a roster of trading card images, selecting a stake card, validating the stake by other users, and writing the ownership information, card information, and roster details to a blockchain deployed for a cross-era fantasy sports trading cards league. As shown in this figure, the phase diagram 600 includes four phases 610-640. Specifically, during a first phase 610, a manager user interacts with the user interface of the application to select digital images of cards to upload to the fantasy sports portal. In this example, the manager user has already selected a roster of player cards 650 and is in the process of selecting a button to 'upload' the roster of player cards 650 to the fantasy sports portal.

After the manager user selects and uploads the digital images of the players, the roster of players 660 is shown on the fantasy sports portal, which is demonstrated in the second phase 620. From the roster of players 660, the manager user selects a particular player card as a stake card 670.

In the third phase 630, all other manager users consider whether the stake card 670 represents a sufficient stake for game play and for the manager user to be verified as a self-writing node of the blockchain. Upon acceptance of the selected stake card 670 by a consensus of the other manager users in the third phase 630, the manager user is permitted to self-write new ownership transaction block(s) 690 to the blockchain 680, as shown in the fourth phase 640. In writing the new ownership transaction block(s) 690, the manager user is including such information as the roster of players 660 for the team (and their digital images and other information), a user identification (ID) uniquely associated with the manager user, and the selected stake card 670. When appraisal and certification of authenticity is required by the league rules, the corresponding appraisals and certificates of authenticity are also written to the new ownership transaction block(s) 690.

Figure 7:
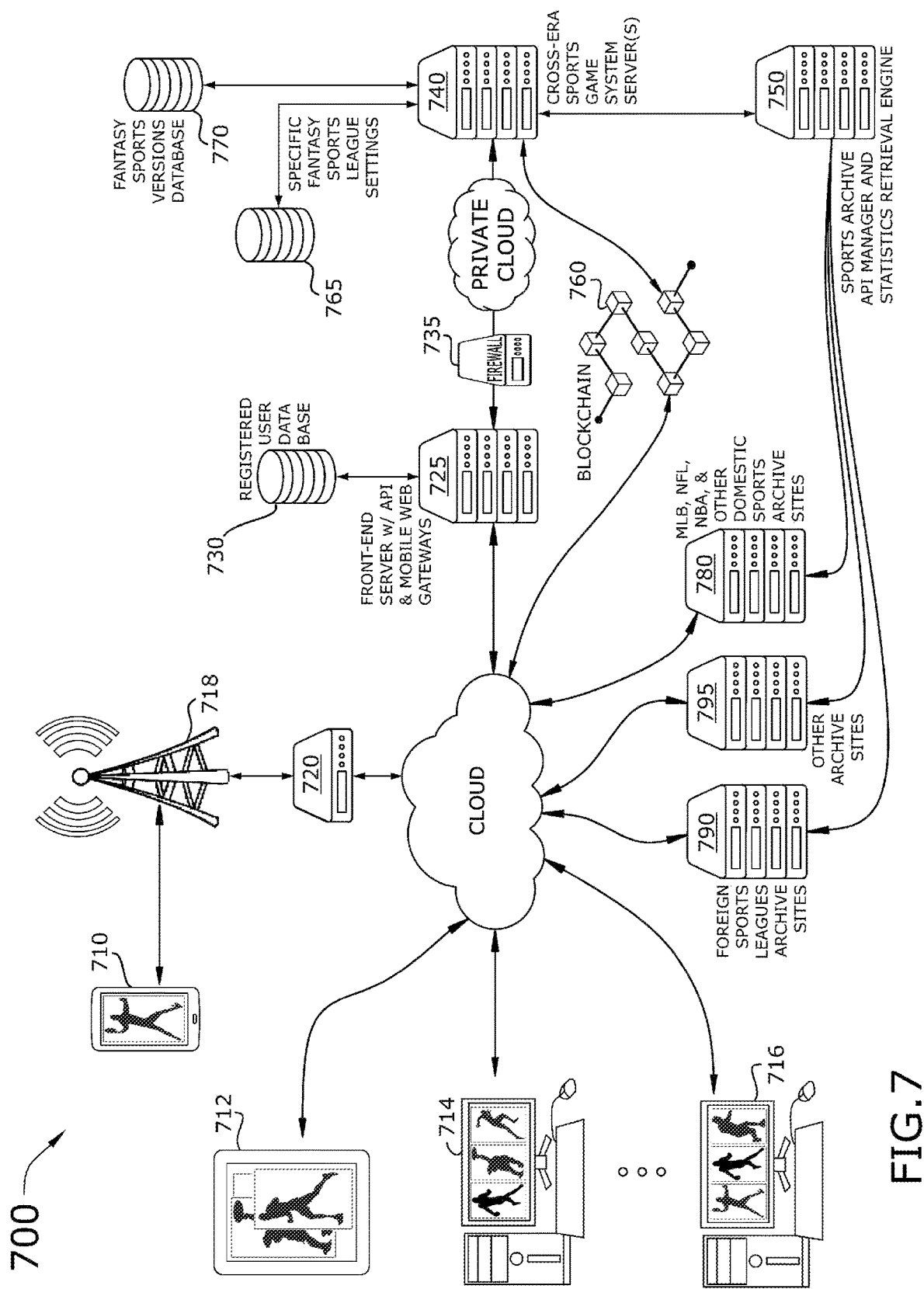
FIG. 7 conceptually illustrates a network architecture of a cloud-based cross-era sports game system that hosts a fantasy sports cloud application platform that provides a secure blockchain deployments for cross-era fantasy sports leagues formed and joined by participating team manager users in some embodiments.

By way of another example, FIG. 7 conceptually illustrates a network architecture of a cloud-based cross-era sports game system 700 that hosts a fantasy sports cloud application platform that provides a secure blockchain deployments for cross-era fantasy sports leagues formed and joined by participating team manager users.

As shown in this figure, the cloud-based cross-era sports game system 700 includes a plurality of computing devices 710-716, a wireless communication point 718 (e.g., a cell tower for cellular data communication), a gateway device 720, a front-end server with API and mobile web gateways 725, a registered manager user database 730, a firewall 735, a cross-era sports game system server 740, a sports archive API manager and statistics retrieval engine 750, a blockchain 760, a specific fantasy sports league settings database 765, a fantasy sports versions database 770, and a plurality of archive sites comprising at least a plurality of domestic sports archive sites 780, foreign sports leagues archive sites 790, and other archive sites 795.

The fantasy sports cloud application platform hosted by the cloud-based cross-era sports game system 700 runs on the cross-era sports game system server 740 and provides secure blockchain deployments for cross-era fantasy sports leagues formed and joined by participating team manager users. In some embodiments, the cross-era sports game system server 740 also provides a fantasy sports platform. In some other embodiments, the cross-era sports game system server 740 provides a plug-in or linked connection to a third-party, external fantasy sports platform or service.

The plurality of computing devices 710-716 are operated by a plurality of manager users who connect to the fantasy sports cloud application platform to engage in cross-era fantasy sports leagues and games. The blockchain 760 conceptually represents multiple blockchains. Specifically, the blockchain 760 represents a blockchain that is deployed for each cross-era fantasy sport league and season formed and played by manager users. The fantasy sports versions database 770 includes configuration settings for quickly deploying different trading cards versions of the cross-era fantasy sports league, such as (without limitation) a 'legends as substitutes' version, a 'legends as players full-time' version, and a 'legends versus current GOATs' version. Additionally, the configuration settings for the different trading card version include pre-configured blockchain implementations which, when deployed for any selected version of the cross-era fantasy sports league, are suitable for the respective version selected. Additional cross-era fantasy sports league settings are stored in the specific fantasy sports league settings database 765. The sports archive API manager and statistics retrieval engine 750 includes the API language bindings that enable data retrieval from the plurality of archive sites 780, 790, and 795. Furthermore, the sports archive API manager and statistics retrieval engine 750 acts as a bridge for the cross-era sports game system server 740 to retrieve statistics and data from the plurality of archive sites 780, 790, and 795.

Many of the above-described features and applications are implemented as software processes that are specified as a set of instructions recorded on a computer readable storage medium (also referred to as computer readable medium, machine readable medium, non-transitory computer readable medium, etc.). In this specification, the terms "software", "software application", "app", and "mobile app" (among others), are meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define specific machine implementations that execute and perform the operations of the software programs.

Figure 8:
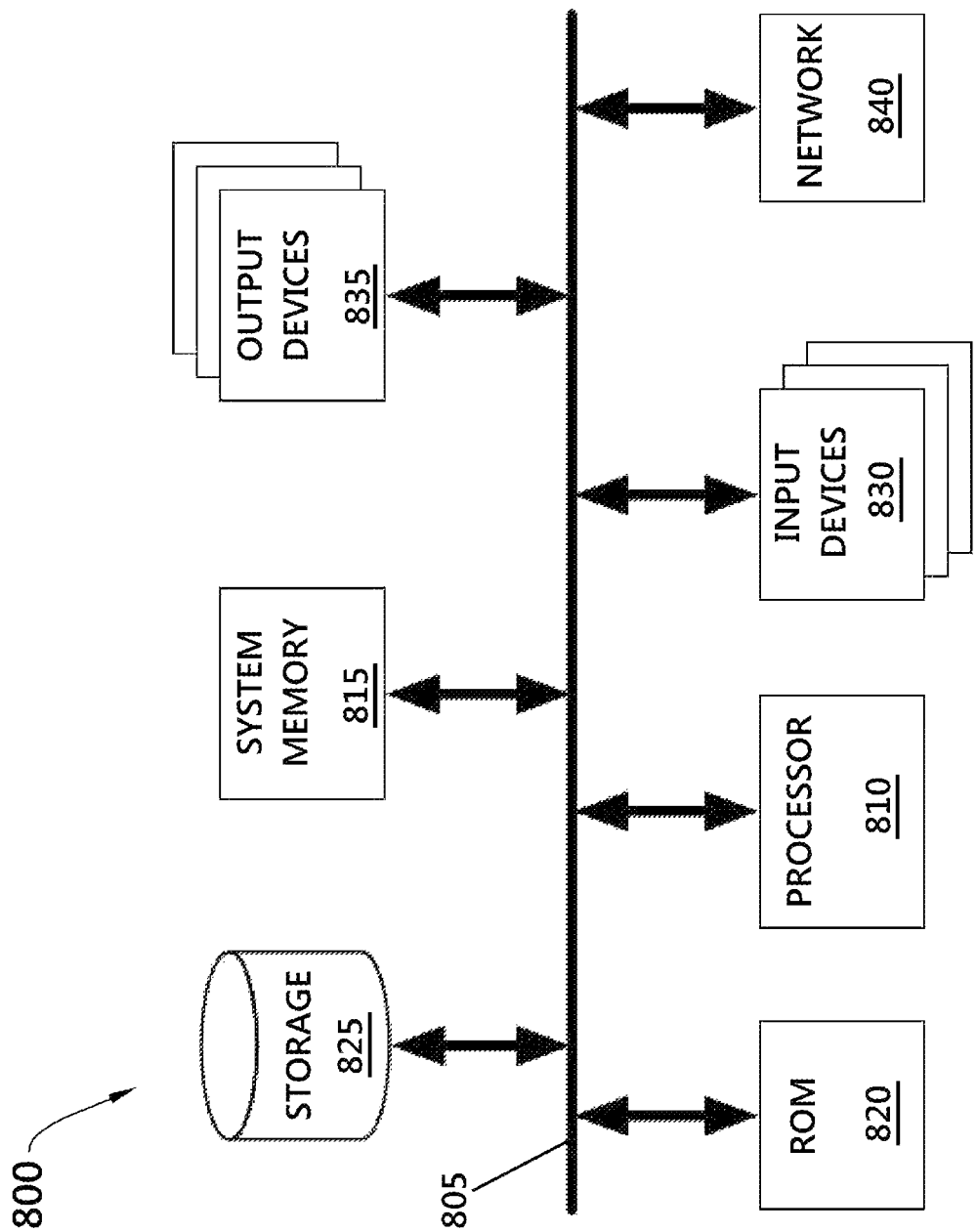
FIG. 8 conceptually illustrates an electronic system with which some embodiments of the invention are implemented.

By way of example, FIG. 8 conceptually illustrates an electronic system 800 with which some embodiments of the invention are implemented. The electronic system 800 may be a computer, phone, PDA, or any other sort of electronic device. Such an electronic system includes various types of computer readable media and interfaces for various other types of computer readable media. Electronic system 800 includes a bus 805, processing unit(s) 810, a system memory 815, a read-only memory 820, a permanent storage device 825, input devices 830, output devices 835, and a network 840.

While the invention has been described with reference to numerous specific details, one of ordinary skill in the art would understand that the invention is not to be limited by the foregoing illustrative details, but rather is to be defined by the appended claims.

I claim:

1. A cross-era fantasy sports game system comprising:
   a cross-era fantasy sports server that hosts a fantasy sports platform that is configured to provide cross-era fantasy sports gaming for users, wherein the cross-era fantasy sports server is configured to manage network connections between computing devices and the fantasy sports platform;
   a cross-era fantasy sports gaming application comprising an interface that enables users to interact with the fantasy sports platform to engage in cross-era fantasy sports leagues;
   a plurality of computing devices operated by users, wherein each computing device comprises a processing unit and a persistent storage that stores the cross-era fantasy sports gaming application, wherein a particular user operating the computing device interacts with the cross-era fantasy sports gaming application when the cross-era fantasy sports gaming application is running on the processing unit and is connected to the fantasy sports platform, wherein the plurality of computing devices comprises a plurality of manager computing devices that are operated by a plurality of manager users participating in a particular cross-era fantasy sports league and season;
   an archive sports site comprising a database that stores historical sports data;
   a sports archive API manager and statistics retrieval engine comprising an application programming interface (API) that provides a language binding between the fantasy sports platform and the archive sports site, wherein the sports archive API manager and statistics retrieval engine provides a bridge connection between the cross-era sports game system server and the archive sports site to retrieve historical sports statistical data stored in the database of the archive sports site;
   a plurality of cross-era fantasy sports gaming databases that store data related to cross-era fantasy sports gaming, wherein the plurality of cross-era fantasy sports gaming databases comprises a fantasy sports versions database, wherein the fantasy sports versions database comprises configuration settings for quickly deploying different trading cards versions of the cross-era fantasy sports league;
   a fantasy sports versions database of the plurality of cross-era fantasy sports gaming databases, wherein the fantasy sports versions database comprises configuration settings for quickly deploying different trading cards versions of the cross-era fantasy sports league; and
   a blockchain deployed for the particular cross-era fantasy sports league and season, wherein the blockchain implements a proof-of-stake blockchain architecture in which each manager computing device corresponding to a manager user who offers at least one stake card that is accepted as a sufficient stake by all other manager users in the particular cross-era fantasy sports league and season is registered as manager computing device node of the blockchain that is authorized to self-write transaction blocks to the blockchain when the corresponding manager initiates any transaction associated with participation in the particular cross-era fantasy sports league and season, wherein the blockchain immutably stores all transactions for the particular cross-era fantasy sports league and season including (i) transactions that set initial rosters of players of teams managed by the plurality of managing users for the particular cross-era fantasy sports league and season and (ii) transactions for in-season and in-game substitutions of players on rosters of teams in the particular cross-era fantasy sports league and season, wherein the initial rosters of players for at least one team managed by a particular manager user comprises current active players and historical legendary players, wherein the transactions for in-season and in-game substitutions immutably stored in the blockchain comprise a plurality of historical substitution transactions initiated by the particular manager user to substitute current active players with historical legendary players and accessible for online tracking, ownership, and visibility for the plurality of manager users participating in the particular cross-era fantasy sports league and season.

2. The cross-era fantasy sports game system of claim 1, wherein the API enables historical data associated with the historical legendary players to be retrieved by the cross-era fantasy sports server that hosts the fantasy sports platform.

3. The cross-era fantasy sports game system of claim 2, wherein the cross-era fantasy sports server that hosts the fantasy sports platform retrieves historical data associated with a particular historical legendary player when the cross-era fantasy sports gaming application running on a particular computing device operated by a particular user uploads a digital image of the particular historical legendary player.

4. The cross-era fantasy sports game system of claim 3, wherein the cross-era fantasy sports server that hosts the fantasy sports platform retrieves historical data associated with the particular historical legendary player for a particular year when the digital image of the particular historical legendary player corresponds to the particular year.

5. The cross-era fantasy sports game system of claim 4, wherein the digital image of the particular historical legendary player comprises a scanned digital image of a physical trading card of the particular historical legendary player.

6. The cross-era fantasy sports game system of claim 5, wherein the physical trading card of the particular historical legendary player is a sports trading card issued in the particular year.

7. The cross-era fantasy sports game system of claim 1, wherein the archive sports site is a first archive sports site in a plurality of archive sports sites.

8. The cross-era fantasy game system of claim 7, wherein the first archive sports site is a site for historical baseball data, wherein the plurality of archive sports sites further comprise a second archive sports site for historical football data and a third archive sports site for historical basketball data.

9. The cross-era fantasy sports game system of claim 1, wherein the fantasy sports platform runs on the cross-era fantasy sports server as a cloud-based fantasy sports platform configured to provide cross-era fantasy sports gaming.

10. The cross-era fantasy sports game system of claim 1, wherein the plurality of cross-era fantasy sports gaming databases comprises a specific fantasy sports league settings database that stores data associated with each cross-era fantasy sports league and season.

11. The cross-era fantasy sports game system of claim 1, wherein the different trading cards versions of the cross-era fantasy sports league comprise a 'legends as substitutes' version, a 'legends as players full-time' version, and a 'legends versus current GOATs' version.

12. The cross-era fantasy sports game system of claim 11, wherein the configuration settings for the different trading card versions comprise pre-configured blockchain implementations which, when deployed for any selected version of the cross-era fantasy sports league, are suitable for the respective trading card version.

13. The cross-era fantasy sports game system of claim 12, wherein the pre-configured blockchain implementations comprise (i) a proof-of-work blockchain that implements a proof-of-work blockchain architecture in which proof of work on a problem is required for any computing device node to write transaction blocks to the proof-of-work blockchain, (ii) a proof-of-authority blockchain that implements a proof-of-authority blockchain architecture, and (iii) a proof-of-stake blockchain that implements the proof-of-stake blockchain architecture in which computing device nodes operated by users are authorized to self-write transaction blocks to the proof-of-stake blockchain when those users each individually offer at least one stake card that is accepted as a sufficient stake by all other users in the cross-era fantasy sports league.

* * * * *